Apr. 17, 1923.
E. BRECEL
CAMPER'S COMBINATION UTENSIL
Filed Nov. 16, 1921
1,452,337
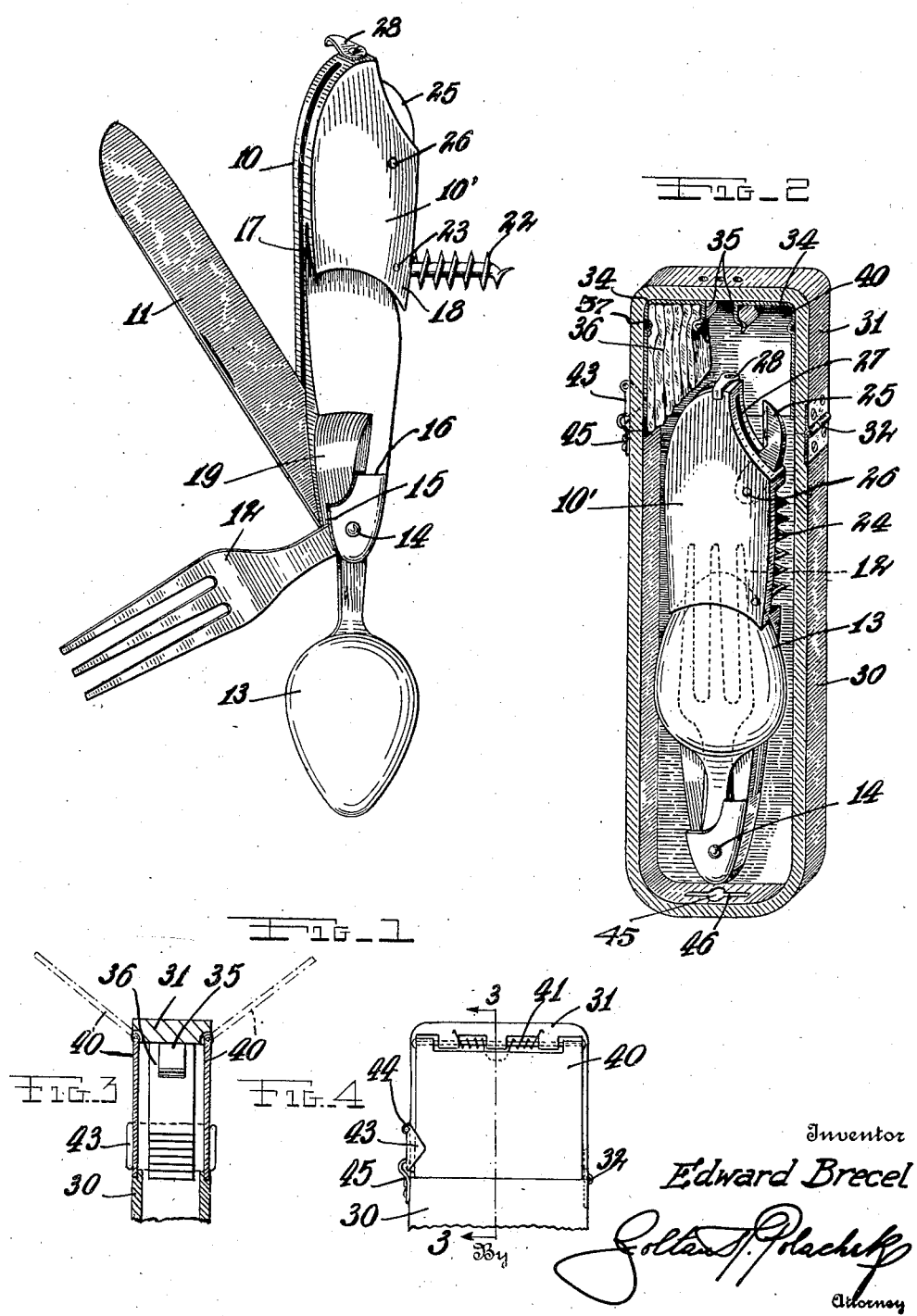
Inventor
Edward Brecel
By
Attorney Patented Apr. 17, 1923.

1,452,337

UNITED STATES PATENT OFFICE.

EDWARD BRECEL, OF BROOKLYN, NEW YORK, ASSIGNOR OF ONE-FOURTH TO PETER DZMITROWICZ, OF BROOKLYN, NEW YORK.

CAMPER'S COMBINATION UTENSIL.

Application filed November 16, 1921. Serial No. 515,525.

*To all whom it may concern:*

Be it known that I, EDWARD BRECEL, a citizen of Poland, residing at Brooklyn, in the county of Kings and State of New York, have invented certain new and useful Improvements in Camper's Combination Utensils, of which the following is a specification.

This invention relates to a combination utensil adapted more particularly for use by campers, or people on picnics or outdoor trips generally.

The invention has for an object to provide a simple utensil of this sort, and to supply therefor a novel type of casing or holder which carries a conveniently arranged cleaning or drying element and which may also serve as a stand to temporarily support the utensil.

For further comprehension of the invention, and of the objects and advantages thereof, reference will be had to the following description and accompanying drawings, and to the appended claims in which the various novel features of the invention are more particularly set forth.

Figure 1 of the drawings is a detail perspective view of my improved combination utensil, showing it removed from its holder, and with the various tools in extended or partially extended positions;

Fig. 2 is a perspective view showing the utensil in its holder, the latter being shown in sectional perspective;

Fig. 3 is a fragmentary sectional view showing one end of the holder, this view being taken along the line 3—3 of Fig. 4; and Fig. 4 is a fragmentary face view showing the same end of the holder.

Referring now to the drawings the reference numeral 10 indicates the handle of my improved utensil and this handle may be of the general construction and configuration common to clasp knives. This handle has pivotally mounted on one end thereof, a knife-blade 11, a fork 12, and a spoon 13, these parts being all pivoted upon a common stud 14.

The knife-blade 11 is located between the two side plates of the handle 10 to fold into the latter in the usual manner. To accommodate the fork 12 and spoon 13 one of the side plates of the handle indicated specifically at 10,' is slotted as at 15 to receive the pivot ends of the fork and spoon, while a recess 16 is cut from the face of said handle inwardly, the slot 15 communicating with said recess which is undercut as at 17, at the end away from the slot 15, to receive the tips of the spoon and fork when the latter are folded, as shown in Fig. 2, the projecting element 18 of the handle side plate 10' protecting said tips. The recess 16 is deepened as at 19 to receive the stem of the fork 12. With this arrangement the fork and spoon are adequately protected while at the same time the handle 10 lacks the bulk which would be essential if the fork and spoon, with their peculiar longitudinal contours, were to be completely enclosed in the handle.

The handle 10 has also mounted thereon a cork-screw 22 pivotally secured at one end as at 23 and adapted to be swung into a suitable recess 24 in the handle back. The handle also carries a can opening blade 25 pivoted as at 26 in a recess 27 in the side plate 10'. The handle also carries a hooked element 28 pivotally attached to the end opposite the stud 14, for use in removing crown stoppers from bottles.

The holder for my improved utensil comprises an elongated casing of rectangular shape in cross section and divided transversely at a short distance from one end into a main body 30 and a cap or cover 31, hinged together at one edge as at 32, these parts being secured together at the opposite edge by fastening means to be presently further described.

The cap 31 has fixed to the edge walls thereof a pair of straps 34 bent at their ends to form a pair of longitudinally projecting clips 35 by means of which a plurality of strips 36 of felt or like material are received in the cap element and extend longitudinally of the holder. The strap 34 present inwardly pressed ribs 37 in juxtaposition to the curved ends of the clips 35 and co-operating with the latter in holding the felt strips 36 in place. These strips 36 are preferably so arranged that their outer ends will engage the adjacent end of the utensil and thus act to prevent the latter from moving or rattling in its holder.

These strips 36 are also adapted to have the knife blade 11 and fork 12 inserted therebetween for drying or cleaning purposes and to permit of such use the side walls of the cap element 31 are in the form of doors such as 40 hinged along the end wall of the cap element and normally urged to open positions in a well known manner by springs 41 engaging their pintles, the end wall of the cap having projecting lips which hold the doors in the oblique positions shown in dotted lines in Fig. 3.

The doors 40 are held in closed positions by the same means that locks the cap 31 to the main body 30 of the holder. This fastening means comprises a bail-like latch 43 suitably pivoted at its ends as at 44 to the cap 31 and adapted to engage under a spring keeper 45 on the holder body 30. As seen in side view this latch 43 is bent to angular shape to cause the legs thereof to project over the doors 40 and thus hold the latter closed, the parts being so arranged that the latch 43 will free itself from the keeper 45 before it disengages from the doors 40, so that the cap 31 can be opened without opening the said doors, or both can be opened at the same time by a longer movement of latch 43.

The end of the holder 30 opposite the cap element 31 is preferably formed with a circular perforation 45 extended on opposite sides in the form of a slot 46, the purpose of which is to enable the holder to serve as a stand or support for the utensil during temporary intermissions in the use thereof.

It is believed that the manner of use of my improved utensil will be readily understood from the above description. While the utensil is in use the holder may be supported on the ground with the extended doors 40 forming legs, while the utensil may be supported temporarily thereon by inserting one of the implements into the opening 45, 46 in the end of the holder 30. When use of the utensil is over the implements can be wiped by passing them between the strips 36, which strips can be readily renewed when desired.

Having thus described my invention what I claim as new and desire to protect by Letters Patent of the United States is as follows:

1. A holder for a utensil of the type described, comprising a casing consisting of a main body and a cap element hinged together, a series of strips of fibrous material carried in the said cap element, and doors forming the side walls of the said cap element.

2. A holder for a utensil of the type described, comprising a casing consisting of a main body and a cap element hinged together, spring clips mounted in said cap element, and a plurality of strips of fibrous material held in the said cap element by the said clips, and hinged doors forming the side walls of the said cap element.

3. A holder for a utensil of the type described, comprising a casing consisting of a main body and a cap element hinged together, spring clips mounted in said cap element, and a plurality of strips of fibrous material held in the said cap element by the said clips, and hinged doors forming the side walls of the said cap element, said doors being hinged to the end wall of the cap element, springs urging said doors to open position, and stop projections on said cap element adapted to hold said doors in position extending obliquely beyond the said end wall.

4. A holder for a utensil of the type described, comprising a casing consisting of a main body and a cap element hinged together, a series of strips of fibrous material carried in the said cap element, and doors forming the side walls of the said cap element, and a common securing means for holding said doors and cap closed.

5. A holder for a utensil of the type described, comprising a casing consisting of a main body and a cap element hinged together, a series of strips of fibrous material carried in the said cap element, and doors forming the side walls of the said cap element, and a common securing means for holding said doors and cap closed, said means including a bail-like latch hinged to said cap and projecting over the said doors.

In testimony whereof I have affixed my signature.

EDWARD BRECEL.